(12) United States Patent
Wada (10) Patent No.: US 7,877,470 B2
(45) Date of Patent: Jan. 25, 2011

(54) MANAGEMENT SYSTEM USING SCRIPTS TO TRANSFER DATA AMONG DEVICES CONNECTED TO A NETWORK

(75) Inventor: Hidehiko Wada, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 823 days.

(21) Appl. No.: 11/762,798

(22) Filed: Jun. 14, 2007

(65) Prior Publication Data
US 2007/0294383 A1 Dec. 20, 2007

(30) Foreign Application Priority Data
Jun. 19, 2006 (JP) ............................. 2006-168898

(51) Int. Cl.
*G06F 15/16* (2006.01)
(52) U.S. Cl. ..................... 709/223; 702/127; 702/179
(58) Field of Classification Search ......... 709/217–219, 709/226, 200–202, 223; 702/127, 179
See application file for complete search history.

(56) References Cited
U.S. PATENT DOCUMENTS

| 6,457,206 B1 * | 10/2002 | Judson | 15/320 |
| 6,615,098 B1 * | 9/2003 | Bode et al. | 700/121 |
| 6,789,338 B2 * | 9/2004 | Sano et al. | 318/568.12 |
| 6,832,251 B1 * | 12/2004 | Gelvin et al. | 709/224 |
| 7,613,285 B2 * | 11/2009 | Ha et al. | 379/102.01 |
| 2004/0230582 A1 * | 11/2004 | Pagnano et al. | 707/100 |
| 2008/0250095 A1 * | 10/2008 | Mizuno | 709/201 |

FOREIGN PATENT DOCUMENTS

JP 2006-091961 A 4/2006

* cited by examiner

*Primary Examiner*—Moustafa M Meky
(74) *Attorney, Agent, or Firm*—Sughrue Mion, PLLC (57) ABSTRACT

A management system including: a management apparatus including a first control unit functioning as an agent; and at least one piece of field equipment connected to the management apparatus with communication connection, the field equipment including a field equipment main body and a second control unit functioning as a first service associated with the field equipment main body. The first service provides at least one of inputting and obtaining information to the corresponding field equipment main body, and the agent performs at least one of the inputting and the obtaining of the information to the field equipment main body through the corresponding first service based on a script describing access destinations and access contents in order.

15 Claims, 8 Drawing Sheets

```
getData Destination1 Data1
getData Destination2 Data2
getData Destination3 Data3,Data4
putData Destination4 Data1,Data2,Data3 ReturnValue1
putData Destination5 Data4 ReturnValue2
putData Destination6 ReturnValue1,ReturnValue2 ReturnValue3
```

MANAGEMENT SYSTEM USING SCRIPTS TO TRANSFER DATA AMONG DEVICES CONNECTED TO A NETWORK

BACKGROUND OF THE INVENTION

1. Field of the Invention

The present invention relates to a management system in a field computing field.

2. Related Art

A system of field computing for collecting information from field equipment, such as a sensor or an actuator, which is located in a field, to perform processing has been used not only in a business field but also in a wide area monitoring system, a distributed control system, and the like (see, for example, JP-A 2006-91961). In this system, a computer (such as a personal computer (PC)) connected to a plurality of pieces of field equipment collects the information from the field equipment to perform the processing by executing an application (program) on the computer.

Figure 8:
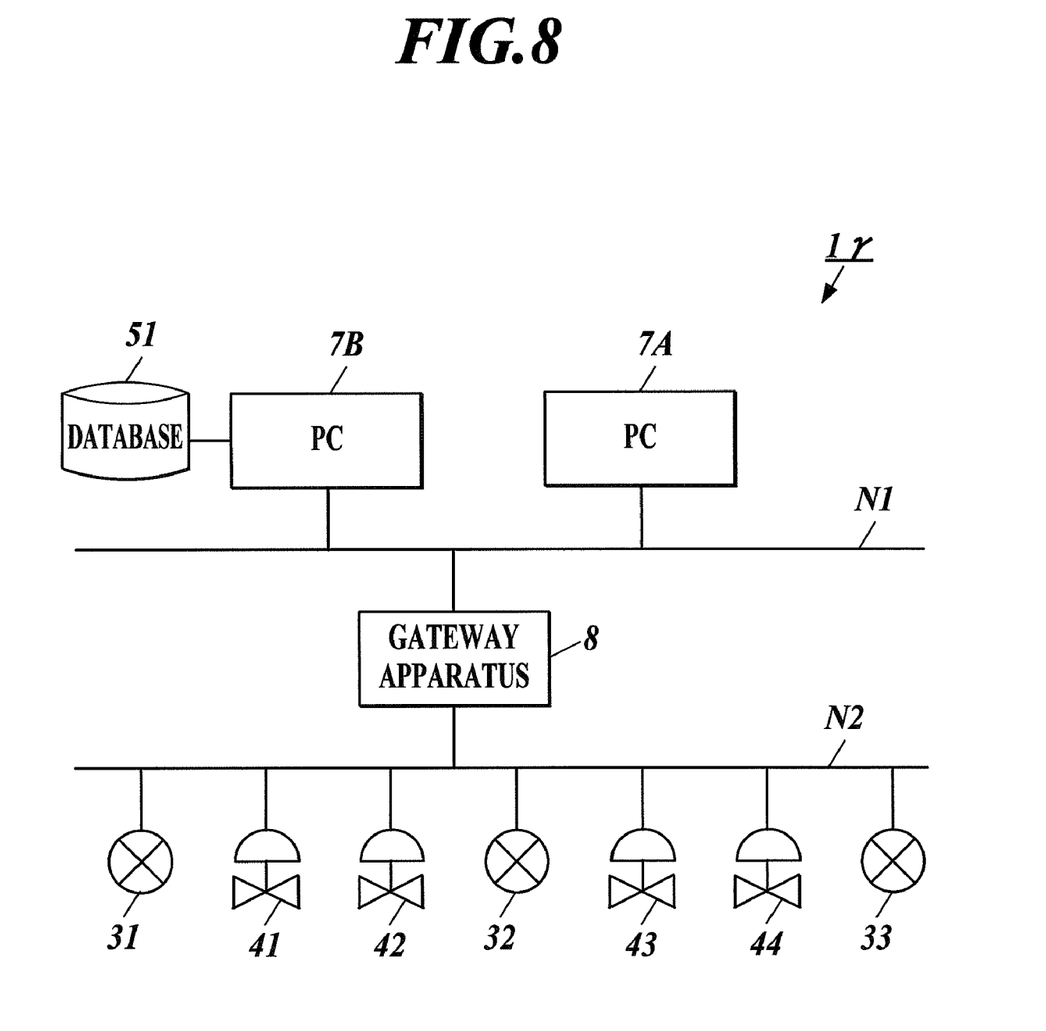
FIG. 8 is a diagram showing the configuration of a conventional control system 1γ.

FIG. 8 shows the configuration of a conventional control system 1γ. As shown in FIG. 8, the control system 1γ is configured to include PCs 7A and 7B, a gateway apparatus 8, a database 51, and sensors 31-33 and actuators 41-44 as field equipment. The database 51 is connected to the PC 7B. The PCs 7A and 7B and the gateway apparatus 8 are connected to each other by communication connection through a communication network N1. The gateway apparatus 8, the sensors 31-33, and the actuators 41-44 are connected to one another by communication connection through a communication network N2.

In the control system 1γ, the PC 7A obtains the measured values and the status values of the field equipment (the sensors 31-33 and the actuators 41-44) by means of the application (programs) of the field computing field which applications are executed by the PC 7A, and the PC 7A stores the obtained values into the database 51. Moreover, the applications of the PC 7A execute necessary operations, and returns information to the field equipment side according to the situation. The PC 7B similarly operates.

Generally, the applications of the PC 7A does not obtain data from a target piece of field equipment in real time. It is determined beforehand that the PC 7A uses the information of which piece of field equipment, and the PC 7A frequently obtains the pieces of information of the field equipment from the gateway apparatus 8, such as a digital control system (DCS), or the database installed in a not shown host computer.

The system for accessing a database frequently changes according to a communication object and a system configuration. Accordingly, the applications of the PC 7A has previously obtained the information concerning where information is located, what kind of the information it is, and how the communication with the information can be performed. The PC 7A obtains information by accessing these gateway apparatus 8 and database 51 through a given interface, and performs control processing by given algorithm.

Moreover, because the information exchanges between the PC 7A and the field equipment cannot be performed by a specific communication system, the equipment frequently performs communications with another system or another computer through the gateway apparatus 8.

The field equipment has been frequently connected with specific communication networks, however, in conventional control systems. For example, when the communication network N2 is a specific one, then it is frequently difficult for the PC 7A, on which the applications operate, to access the field equipment. Only the information stored in the given gateway apparatus 8, the database 51, or the like beforehand has been available for (the applications of) the PC 7A. Moreover, it has been necessary for the PC 7A to be aware of the interface for accessing the gateway apparatus 8, the database 51, and the like beforehand.

When these situations are examined from the points of view of the applications of the PC 7A, the situations have the following problems:

(1) it is not possible to access the field equipment in real time to obtain and set just the current information;

(2) there can be used only the information that exists at the positions at which the locations of data and the interfaces have been aware of beforehand; and (3) it is necessary to be aware of the interfaces for accessing the gateway apparatus, the database, and the like beforehand.

In a word, the combination of the side of supplying information and the side of using the information must be determined in advance.

Consequently, when the kind of the necessary information and the method (e.g., interface) of supplying the information are different, then the application (programs) must be remade. Moreover, even when the algorithm processing information is altered only a little, the whole application (program) must be remade. Accordingly, when the kind of information or the access means to the information is different even when the functions and the objects of applications are the same, it is necessary to develop a plurality of application (programs) that are almost the same and similar to each other. Moreover, it is also necessary to manage the plurality of application (programs).

Because it is determined beforehand which data is obtained from which piece of equipment and how the data is processed, it is difficult to dynamically change the processing algorithm and the obtainment source of the data in order to cope with various requirements of a user.

A system called as a service oriented architecture (SOA) combining services to construct an application has been spreading mainly around a business system field. In the field computing field, however, the communications with equipment are limited to the use of a specific system. Owing to the limitation, the services are provided by the functions of the field equipment. Consequently, the present state is that the applications based on the SOA are not constructed yet. Furthermore, a system using the SOA in order to dynamically change data and processing systems are not realized yet.

SUMMARY OF THE INVENTION

It is an object of the present invention to access field equipment through a service in a field computing field, and to easily and dynamically specify an algorithm and data processing accompanied by the access of the field equipment.

In order to solve the problem, according to a first aspect of the invention, the management system comprises:

a management apparatus including a first control unit functioning as an agent; and at least one piece of field equipment connected to the management apparatus with communication connection, the field equipment including a field equipment main body and a second control unit functioning as a first service associated with the field equipment main body, wherein the first service provides at least one of inputting and obtaining information to the corresponding field equipment main body, and the agent performs at least one of the inputting and the obtaining of the information to the field equipment main body through the corresponding first service based on a script describing access destinations and access contents in order.

In accordance with a second aspect of the invention, the management system comprises:

a management apparatus including a first control unit functioning as an agent;

at least one piece of field equipment; and a control apparatus connected to the management apparatus with communication connection, the control apparatus including a second control unit functioning as a first service associated with the field equipment, wherein the first service provides at least one of inputting and obtaining information to the corresponding field equipment, and the agent performs at least one of the inputting and the obtainment of the information to the field equipment through the corresponding first service based on a script describing access destinations and access contents in order.

According to the first or the second aspect of the present invention, the first service of desired field equipment can be accessed at desired timing in the field computing field, and at least either of the input and the output of the information can be easily performed. And only by changing the script, the algorithm and the data processing accompanied by the access of the field equipment can be easily and dynamically specified.

Preferably, the management system further comprises at least one piece of arithmetic equipment connected to the management apparatus with the communication connection, the arithmetic equipment including a third control unit functioning as a second service, wherein the second service performs a predetermined operation to an input value and provides an operation result of the operation, and the agent inputs the input value pertaining to the information of the field equipment to the corresponding second service and obtains the operation result, based on the script describing the access to the second service.

According to such a management system, the second service of desired arithmetic equipment can be accessed at desired timing, and the operation of the input value pertaining to the information of the field equipment can be easily performed.

Preferably, the management further comprises at least one piece of database equipment connected to the management apparatus with the communication connection, the database equipment including a database and a fourth control unit functioning as a third service associated with the database, wherein the third service provides at least one of reading, storing, and operating data to the corresponding database, and the agent performs at least one of the reading, the storing, and the operating of the data to the database, the data pertaining to the information of the field equipment, through the corresponding third service based on the script describing the access to the third service.

According to such a management system, the third service of desired database equipment can be accessed at desired timing, and at least one of the reading, the storing and the operating of the data of the database pertaining to the information of the field equipment can be easily performed.

DETAILED DESCRIPTION OF THE PREFERRED EMBODIMENTS

In the following, an embodiment according to the present invention will be described in detail with reference to the attached drawings. However, the scope of the present invention is not limited to the shown examples.

Figure 1:
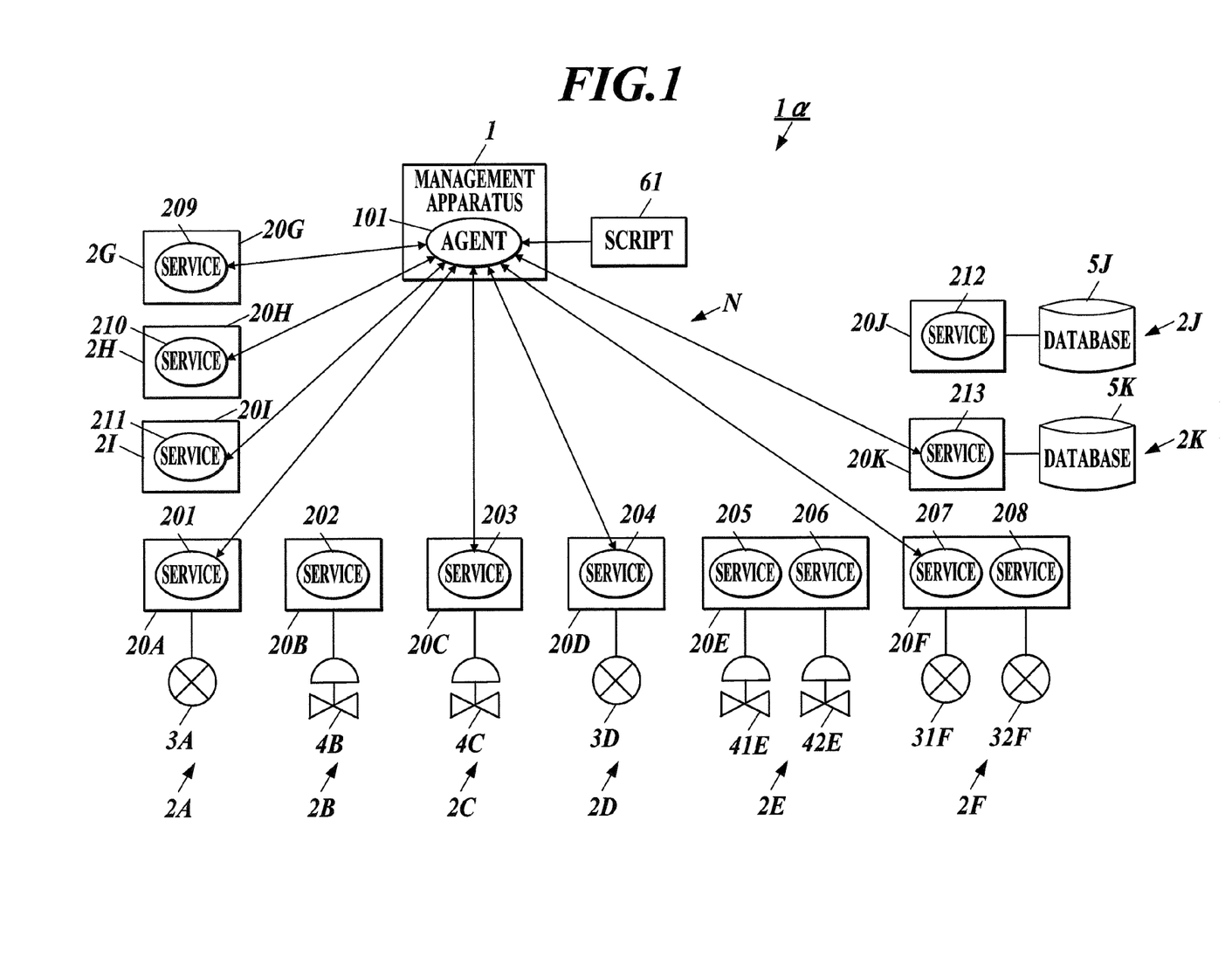
FIG. 1 is a diagram showing the configuration of a management system 1α of an embodiment according to the present invention.

First, the configuration of a management system 1α of the present embodiment will be described with reference to FIG. 1. FIG. 1 shows the configuration of the management system 1α of the present embodiment. The management system 1α is a system of managing field equipment, obtaining the measured values and the status values of the field equipment, and performing various kinds of processing based on the obtained values.

As shown in FIG. 1, the management system 1α is configured to include a management apparatus 1, field equipment 2A-2F, arithmetic equipment 2G-2I, and database equipment 2J and 2K. The management apparatus 1 and the equipment 2A-2K are connected with each other through a communication network N. In the following, the field equipment 2A-2F, the arithmetic equipment 2G-2I, and the database equipment 2J and 2K will be referred to as equipment 2A-2K.

FIG. 1 shows as an example that the objects of the transmission and the reception of information of the management apparatus 1 are supposed to be the field equipment 2A, 2C, 2D, and 2F, the arithmetic equipment 2H, and the database equipment 2K, and that the management apparatus 1 and these pieces of equipment are connected to each other by arrows. But, in fact, the management apparatus 1 is connected to all of the equipment 2A-2K. The communication network N is supposed to be, for example, an internet protocol (IP) network, which is generally spread.

The connection between the management apparatus 1 and the equipment 2A-2K is not limited to the one using the communication network N, but the communication connection of 1:N (N: the total number of the pieces of equipment) may be used. Moreover, each of the numbers of pieces of the field equipment, the arithmetic equipment, and the database equipment is not limited to that shown in FIG. 1.

The management apparatus 1 includes an agent 101. The agent 101 is a software agent, and is produced by the execution of an agent program by the control unit of the management apparatus 1. The agent 101 has the function of performing various kinds of processing based on the information exchange with services, which will be described later. The agent 101 performs the transmission and the reception of information with the equipment 2A-2K based on a script 61 to perform the various kinds of processing. The script 61 is the data including the objects to which the agent 101 accesses, the information to be transmitted and received, and the orders of access.

The field equipment 2A includes a control apparatus 20A and a sensor 3A. The control apparatus 20A has a service 201 as a first service. The service 201 is a service in the SOA. The service 201 is generated by the execution of a service program by the control unit of the control apparatus 20A, and has the function of returning the reply information corresponding to input information to a request source (the management apparatus 1 here). The service 201, to put it concretely, obtains a measured value of the sensor 3A to reply based on a request of the agent 101. The sensor 3A is a sensor as a piece of field equipment, such as a temperature sensor and a flow rate sensor.

The field equipment 2B includes a control apparatus 20B and an actuator 4B. The control apparatus 20B has a service 202 as the first service. The service 202, to put it concretely, obtains the status value of the actuator 4B based on a request of the agent 101 to reply. The actuator 4B is an actuator as a piece of field equipment, such as a flow rate valve. Moreover, in some states, it is possible to input information from the agent 101 to the field equipment 2B.

Each piece of field equipment provides the function thereof as a service. In the present embodiment, the following type of field equipment will be described. That is, the field equipment is equipped with a field equipment main body and a control apparatus. The field equipment main body cannot realize a service, and a built-in control apparatus realizes the service. The field equipment like this is based on the supposition of the case where the resources of the equipment main body, such as a sensor and an actuator, are limited, or the network to be connected to the field equipment main body is a particular kind one. However, the present invention is not limited to the field equipment like this, but there can be adopted the configuration in which the field equipment is configured to be unable to realize the function of a service and a control apparatus for realizing the service is connected to the field equipment as an external device. Moreover, each piece of field equipment opens the function of the service that the field equipment provides to the public and an interface for using the service. Moreover, although the descriptions are given by using the sensors and the actuators as the pieces of field equipment, the field equipment is not limited to them, and the other field equipment may be used.

The field equipment 2C includes a control apparatus 20C and an actuator 4C similarly to the field equipment 2B, and the control apparatus 20C has a service 203. The field equipment 2D includes a control apparatus 20D and a sensor 3D similarly to the field equipment 2A, and the control apparatus 20D has a service 204.

The field equipment 2E includes a control apparatus 20E and actuators 41E and 42E similarly to the field equipment 2B, and the control apparatus 20E has services 205 and 206. The field equipment 2F includes a control apparatus 20F and sensors 31F and 32F similarly to the field equipment 2A, and the control apparatus 20F has services 207 and 208.

The arithmetic equipment 2G includes a control apparatus 20G, and the control apparatus 20G has a service 209 as a second service. The service 209, to put it concretely, performs various operations of the input information from the agent 101 as for the information of field equipment, and replies with the operation results. The arithmetic equipment 2H includes a control apparatus 20H similarly to the arithmetic equipment 2G, and the control apparatus 20H has a service 210. The arithmetic equipment 2I includes a control apparatus 20I similarly to the arithmetic equipment 2G, and the control apparatus 20I has a service 211.

The database equipment 2J includes a control apparatus 20J and a database 5J, and the control apparatus 20J has a service 212 as a third service. The service 212, to put it concretely, reads data to the database 5J to reply, stores the data into the database 5J, and performs the various operations of input information from the agent 101 to reply with the operation results based on at least one piece of request information of the read of data, the storage of the data, and the operation of the data from the agent 101 with regard to the information of field equipment. The database equipment 2K includes a control apparatus 20K and a database 5K similarly to the database equipment 2J, and the control apparatus 20K has a service 213.

Figure 2:
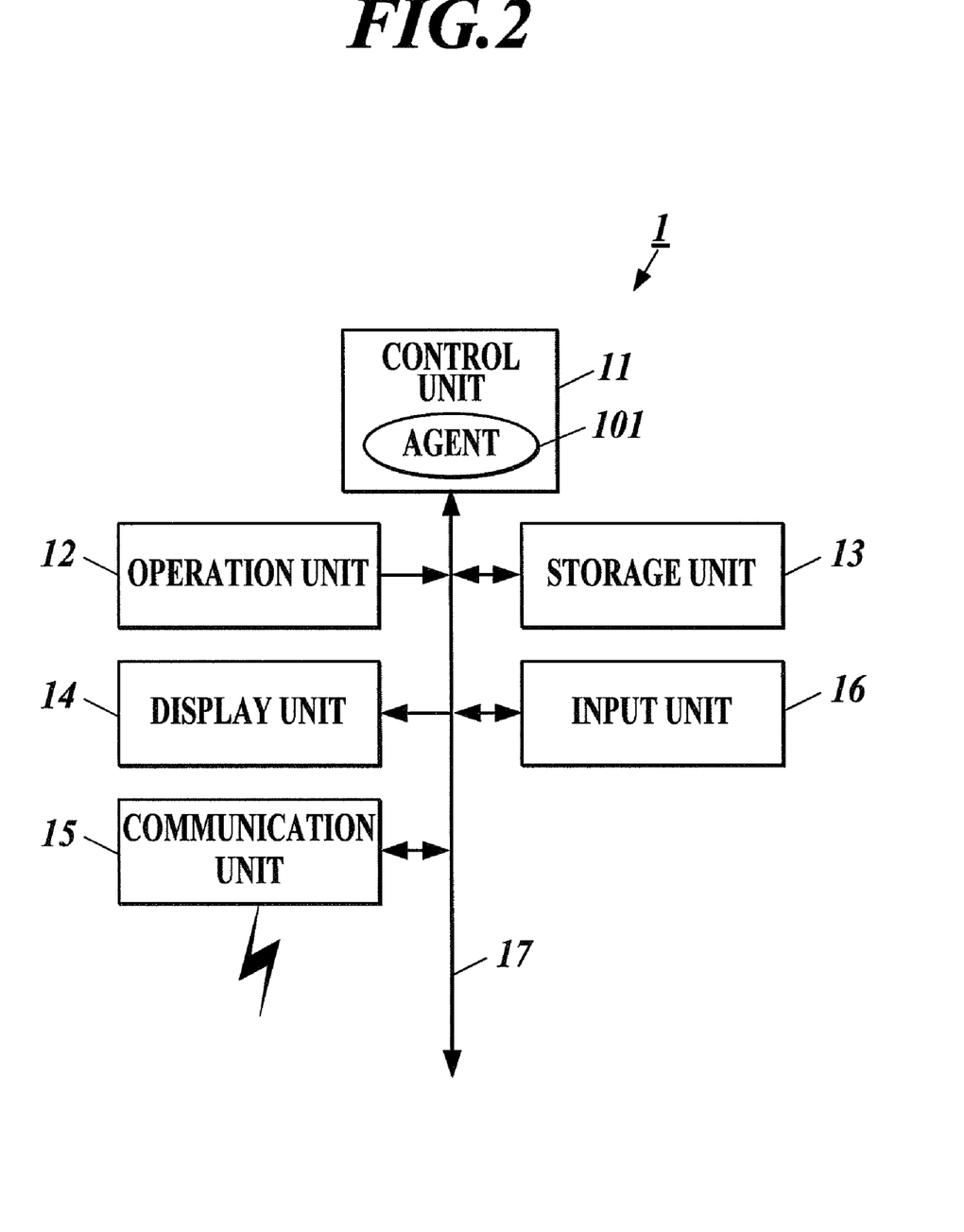
FIG. 2 is a diagram showing the internal configuration of a management apparatus 1.

Next, the internal configuration of the management apparatus 1 will be described. FIG. 2 shows the internal configuration of the management apparatus 1. As shown in FIG. 2, the management apparatus 1 is configured to include a control unit 11 as a first control unit, an operation unit 12, a storage unit 13, a display unit 14, a communication unit 15, and an input unit 16, and each unit is connected to one another through a bus 17.

The control unit 11 includes a central processing unit (CPU), a random access memory (RAM), and the like. In the control unit 11, the CPU reads specified programs out of the system program and application programs, both stored in the storage unit 13, and expands the read specified programs in the RAM. Various kinds of processing are then executed by the cooperation of the programs expanded in the RAM and the CPU. In the control unit 11, in particular, the agent 101 described above is formed by the cooperation of an agent program expanded in the RAM and the CPU.

The operation unit 12 includes a keyboard, a pointing device, such as a mouse, and the like, and receives key input information or position input information, both input by a user, as an input signal to output the input signal to the control unit 11.

The storage unit 13 is configured to include a recording medium, such as a hard disk drive (HDD), which information can be read from and written into, and the storage unit 13 stores various kinds of data and various kinds of programs. The recording medium of the storage unit 13 especially stores an agent program for forming the agent 101.

The display unit 14 is a display apparatus, such as a liquid crystal display (LCD), and displays various kinds of information based on the display signals from the control unit 11.

The communication unit 15 is composed of a router or the like, and is connected to the communication network N to mediate communication with the equipment on the communication network N.

The input unit 16 is a drive of a portable recording medium, such as a flexible disk and a CD, and has at least the function of reading information recorded on the recording medium and of outputting the read information to the control unit 11. In the present embodiment, the input unit 16 is described as the one to be used for reading the script 61 stored in the recording medium to be input into the input unit 61. However, the present invention is not limited to the way, but the script 61 may be operated and input by a user through the operation unit 12, or may be input by the reception from external equipment through the communication unit 15. Furthermore, the management apparatus 1 may adapted so that an application existing in the control unit 11 may generate the script 61 and input the generated script 61 by the execution thereof.

Figure 3:
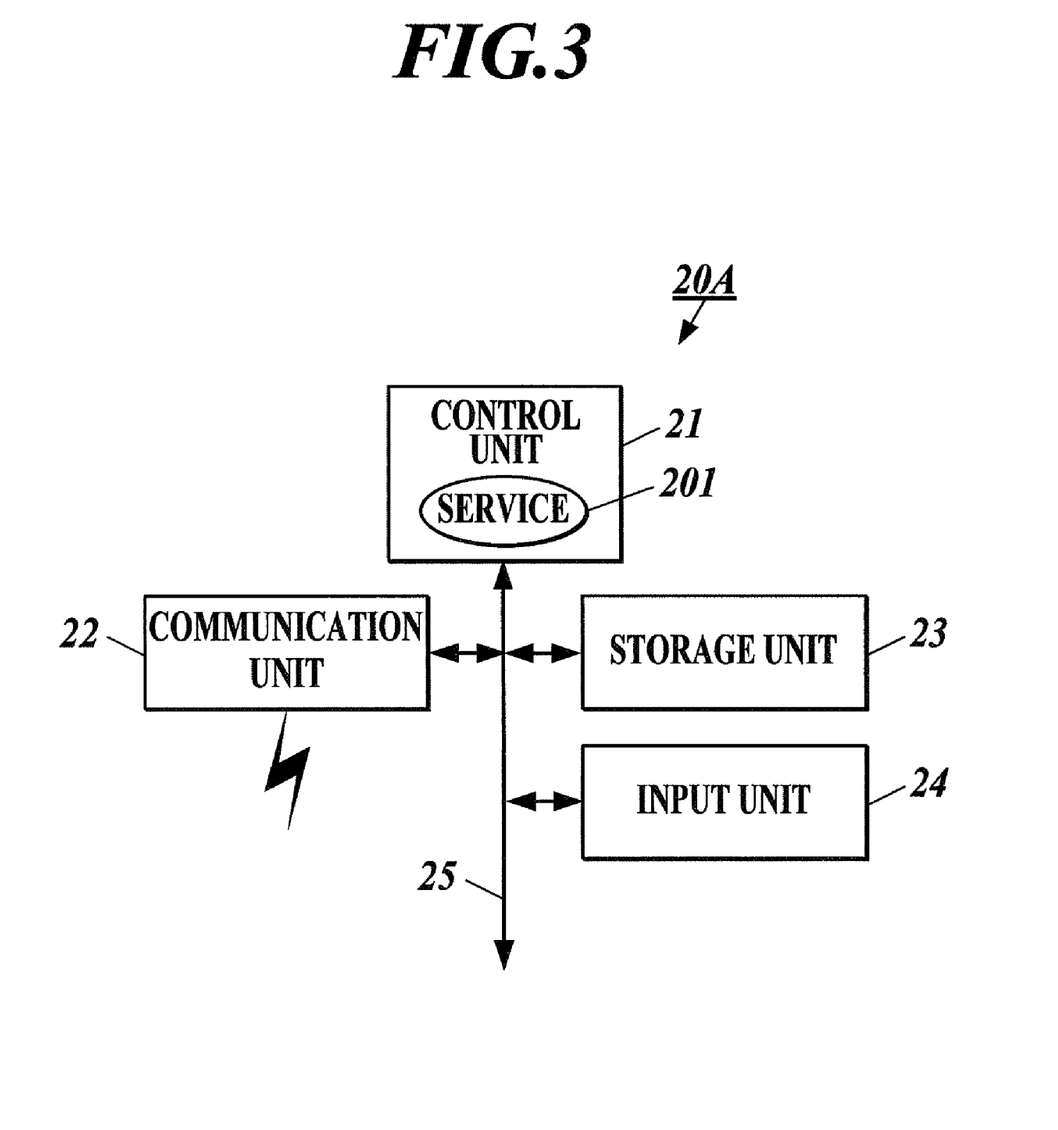
FIG. 3 is a diagram showing the internal configuration of a control apparatus 20A.

Next, the internal configuration of the control apparatus 20A will be described on behalf of the control apparatus 20A-20K. FIG. 3 shows the internal configuration of the control apparatus 20A. As shown in FIG. 3, the control apparatus 20A is configured to include a control unit 21 as the first control unit, a communication unit 22, a storage unit 23, and a connection unit 24, and each unit is connected to one another through a bus 25.

The control unit 21 includes a CPU, a RAM, and the like. In the control unit 21, the CPU reads specified programs out of the system program and application programs, both stored in the storage unit 23, and expands the read specified programs in the RAM. Various kinds of processing are then executed by the cooperation of the programs expanded in the RAM and the CPU. In the control unit 21, the service 201 described above is especially formed by the service program.

The service 201 includes a Web server function, a data provision function, and a device driver function. The Web server function is the function for enabling the equipment on the communication network N to access the control unit 21. The data provision function is the function of providing data access, and, for example, is the XML-DA server function of providing the data access in accordance with the standard of the eXtensible Markup Language-Data Access (XML-DA). The device driver function is the function of controlling the devices (such as the sensor 3A) connected to the connection unit 24.

The communication unit 22 is composed of a router or the like, and is connected to the communication network N to mediate the communication with the equipment on the communication network N.

The storage unit 23 is composed of a read only memory (ROM), a flash memory, or the like, and stores various programs and data. The storage unit 23 especially stores a service program for forming the service 201.

The connection unit 24 mediates the connection with the sensor 3A as a device.

The control apparatus 20B-20D severally have the similar configuration to that of the control apparatus 20A. The control apparatus 20E and 20F severally have the similar configuration to that of the control apparatus 20A, but two devices are connected to the connection unit 24 of each of the control apparatus 20E and 20F, and the control unit 21 of each of them forms two services correspondingly to the two devices. The control apparatus 20G-20I severally include the control unit 21 as a third control unit, the communication unit 22, and the storage unit 23, but do not include the connection unit 24. Consequently, the services 209-211 do not have the device driver function. The control apparatus 20J and 20K severally have the control unit 21 as a fourth control unit, the communication unit 22, the storage unit 23, and the connection unit 24.

The control apparatus may be configured to be connected to three or more devices (field equipment main bodies and databases) to be equipped with three or more services.

Figure 4:
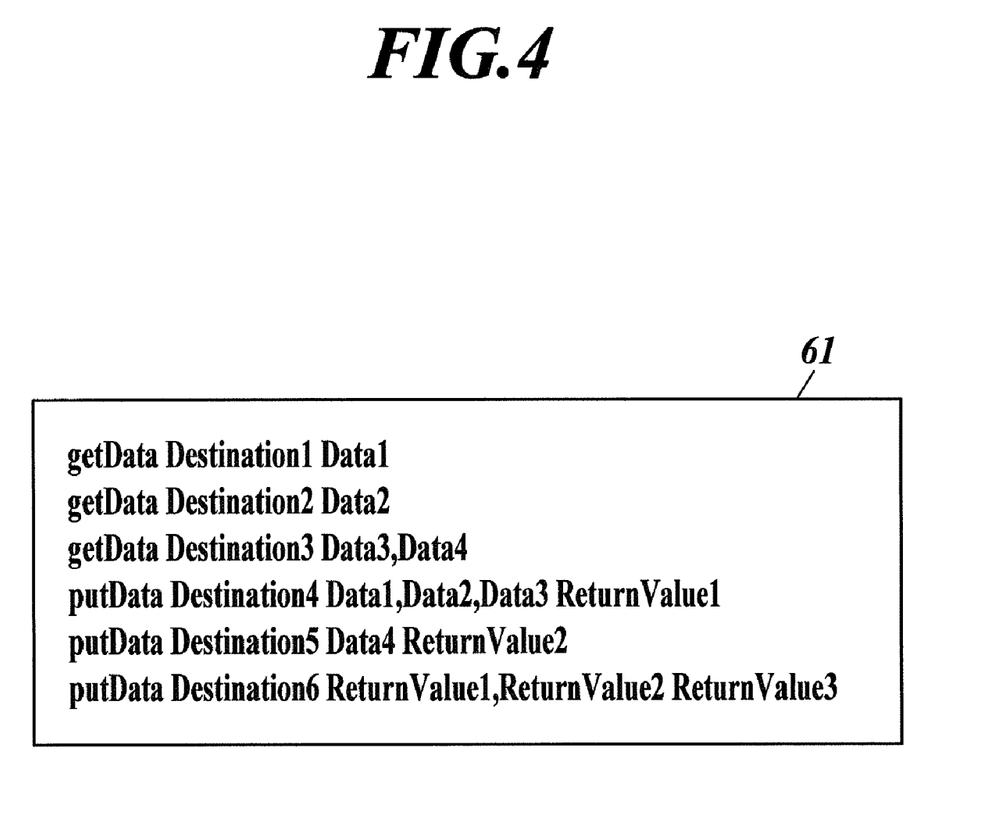
FIG. 4 is a view showing the configuration of a script 61.

Next, the script 61 will be described with reference to FIG. 4. FIG. 4 shows the configuration of the script 61. As shown in FIG. 4, the lines of data obtainment instructions are arranged in order from the upper part of the script 61.

Each instruction is composed of a command, a target, an argument, and a return value.

The command specifies a calling function to a service. The command is supposed to be capable of being peculiarly defined to a service. For example, in FIG. 4, "get Data" is a command for obtaining data from a service and not receiving any input values. In FIG. 4, "put Data" is a command for passing data (input value) to a service and receiving a return value from the service.

The target as an access destination specifies a service to be called. "Destination *" shown in FIG. 4 is a target indicating the service of an access destination; to put it concretely, "Destination *" is severally associated to each of the services 201-213 of the field equipment 2A-2F, the arithmetic equipment 2G-2I, and the database equipment 2J and 2K. Incidentally, it is supposed that the target, the place where a service to be the target is operating, and the interface are associated with one another to be registered in a directory service or the like in advance. And the agent 101 refers to the registered information using the target of the script 61 as a key, and thereby can know the service and the interface, both corresponding to the obtained target.

The argument is the one for specifying a value needed when a service is called. The return value is the one for specifying a variable storing a value to be returned by the calling of the service. The "Data *" shown in FIG. 4 is a return value as the data to be obtained, and is also used as the argument as an input value. A "Return Value *" shown in FIG. 4 is a return value as an operation result, and is also used as the argument as an input value.

The agent 101 executes various kinds of processing by reading the instructions of the script 61 one by one while executing the direction written in each instruction in order.

It is also possible to specify synchronous processing or asynchronous processing by the commands of the "get Data" and "put Data" in the script 61. Moreover, the script 61 can have a control structure, and it is supposed that the script 61 can describe the assignment to a variable, the control structures, such as "if" and "while," an exception structure, a call of a callback function, and the like. Moreover, the script 61 can be dynamically changed by a user's operation, an application executed on the management apparatus 1, and the like.

Figure 5:
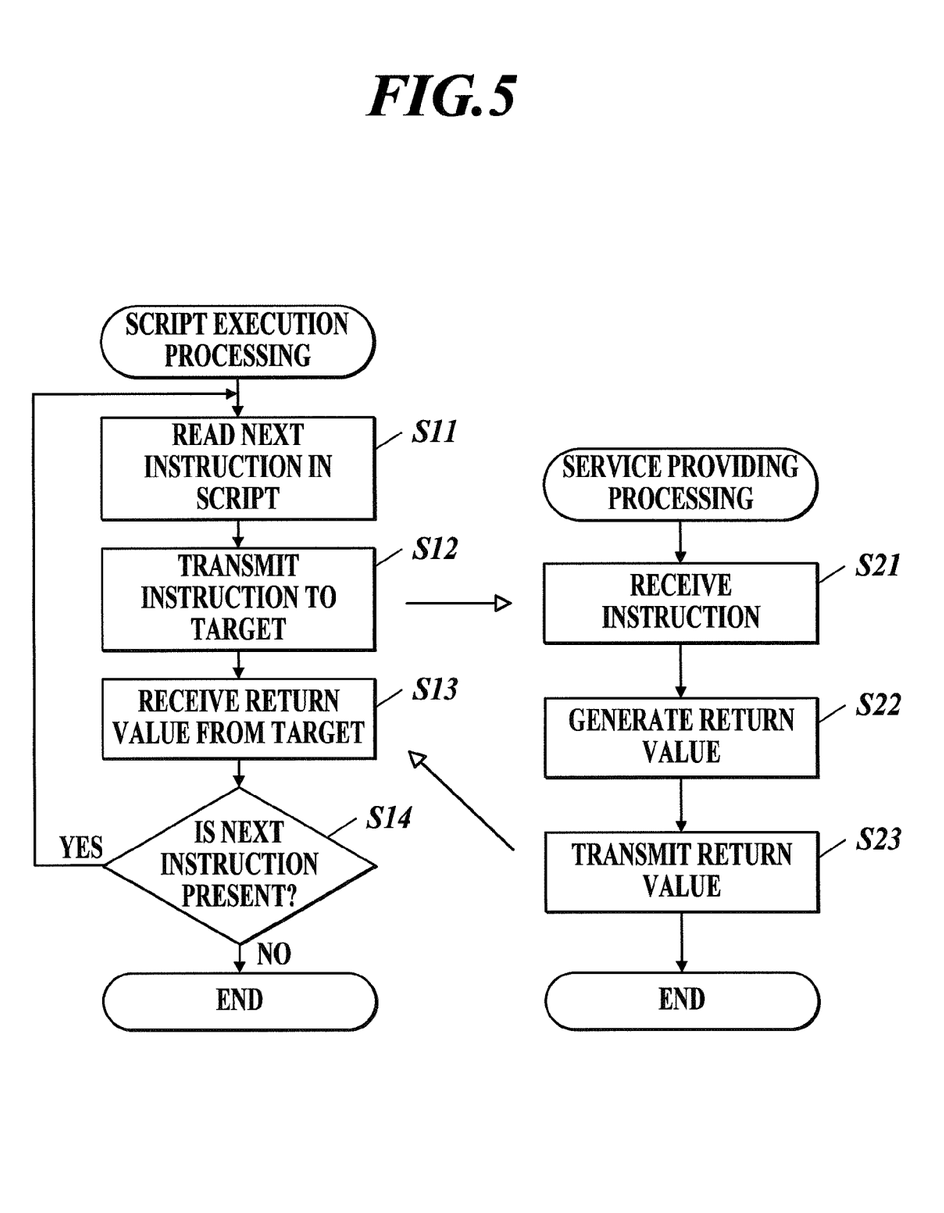
FIG. 5 is a flow chart showing script execution processing and service providing processing.

Next, the operation of the management system 1α will be described with reference to FIG. 5. There will be described the script execution processing executed by the agent 101 and the service providing processing executed by the services 201-213. FIG. 5 shows the flows of the script execution processing and the service providing processing.

With reference to FIG. 5, the script execution processing executed by the agent 101 will be described. The execution of the script execution processing is started by the agent 101 by using, for example, the input of the script 61 through the input unit 16 as a trigger.

First, the agent 101 reads the next instruction in the input script 61 in order from the uppermost part thereof (step S11). In the case where the agent 101 reads the instruction at the first time, the agent 101 reads the uppermost instruction.

The agent 101 then transmits the instruction including a command, an argument, and a return value to the target (service) read at the step S11 through the communication network N (step S12). At the step S12, the agent 101 accesses a directory service (not shown) and specifies the position and the interface of an actual service based on the target read from the script 61 before transmitting the command and the like to the service.

The agent 101 then receives through the communication network N a return value from the target to which the agent 101 has transmitted the command (step S13). The agent 101 then judges whether there is the next instruction that has not been executed yet in the script 61 or not (step S14). If there is the next instruction in the script 61 (step S14; YES), then the processing of the agent 101 moves to the step S11. If there is not the next instruction in the script 61 (step S14; NO), the script execution processing is terminated.

Next, the service providing processing executed by each of the services 201-213 will be described with reference to the FIG. 5. The execution of the service providing processing is started by the service being the target, for example, at the time of the starting of the reception of an instruction, as a trigger, which instruction has been transmitted from the agent 101 through the communication network N.

First, the service completes the receiving of the instruction transmitted from the agent 101 correspondingly to the step S12 of the script execution processing (step S21). The instruction sometimes includes an argument as input information. If a return value is requested based on the instruction received at the step S21, then the service generates the return value (step S22). The return value is, for example, a status value of the field equipment (services 201-208), an operation result to the input value (services 209-211), or the requested data (services 212 and 213).

The service then transmits the return value generated at the step S22 to the agent 101 correspondingly to the step S13 of the script execution processing (step S23), and the service providing processing is terminated. Incidentally, the processing at the steps S22 and S23 is not executed when no return values exist.

Now, the concrete examples of the operation of the management system 1α are described. It is supposed that, for example, the services 201, 203, 213, 209, 210, and 211 are associated with the Destinations 1-6 in the script 61 of FIG. 4, respectively. Then, the agent 101 obtains the measured value Data 1 of the sensor 3A from the service 201 by the execution of the script 61; the agent 101 obtains the status value Data 2 of the actuator 4C from the service 203; the agent 101 obtains the Data 3 and Data 4, both stored in the database 5K, from the service 213; the agent 101 inputs the Data 1, the Data 2, and the Data 3 into the service 209 as input values, and obtains the operation result Return Value 1; the agent 101 inputs the Data 4 to the service 210 as an input value, and obtains the operation result Return Value 2; the agent 101 inputs the Return Value 1 and the Return Value 2 into the service 211 as input values, and finally obtains the operation result Return Value 3.

As described above, according to the present embodiment, because the agent 101 functions in the management apparatus 1 and the services 201-208 provide information output functions in the field equipment 2A-2F, the agent 101 can access the services 201-208 of the field equipment 2A-2F in the field computing field to easily perform the input and the obtainment of information.

Moreover, because the services 209-211 provide operation functions in the arithmetic equipment 2G-2I, the agent 101 can access the services 209-211 of the arithmetic equipment 2G-2I to easily perform the operation of the input values pertaining to the information of the field equipment 2A-2F.

Moreover, because the services 212 and 213 provide the access functions of the databases 5J and 5K in the database equipment 2J and 2K, the agent 101 can access the services 212 and 213 of the database equipment 2J and 2K to easily perform the reading, the storage, and the operation of data of the data bases 5J and 5K pertaining to the information of the field equipment 2A-2F.

Moreover, because targets, commands, and the like are described in the script 61 in order as access destinations and access contents, the agent 101 can access the desired piece of equipment at desired timing.

Moreover, only by specifying (changing) the descriptions in the script 61, there can be easily and dynamically specified the algorithm and the data processing, both pertaining to the access of the field equipment (such as the obtainment of the output information of field equipment, the obtainment of the operation results of arithmetic equipment, and the information access and the operation of database equipment).

Example 1

Figure 6:
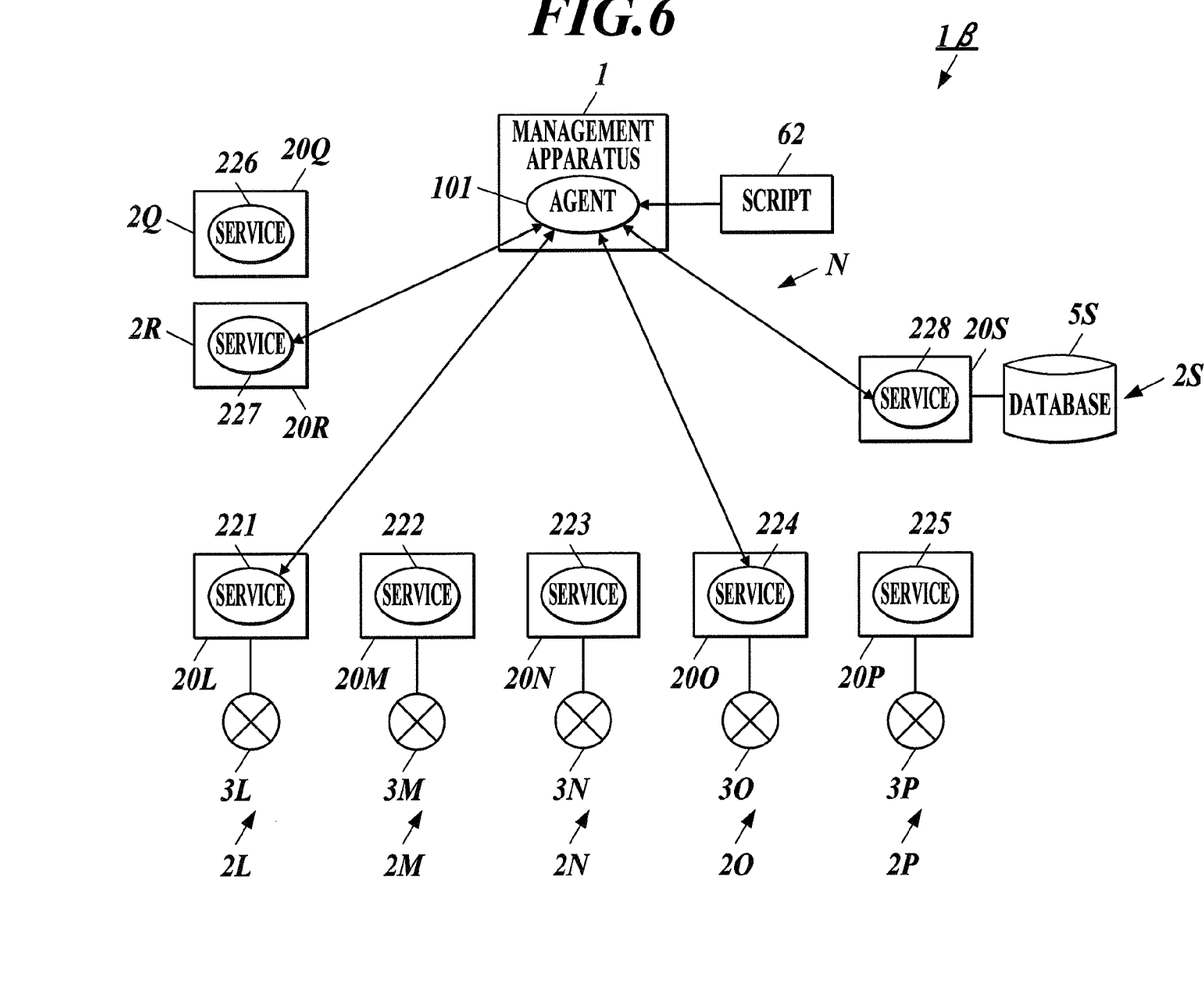
FIG. 6 is a diagram showing the configuration of a management system 1β in the case of performing a short-period road freezing prediction of an example 1.
Figure 7:
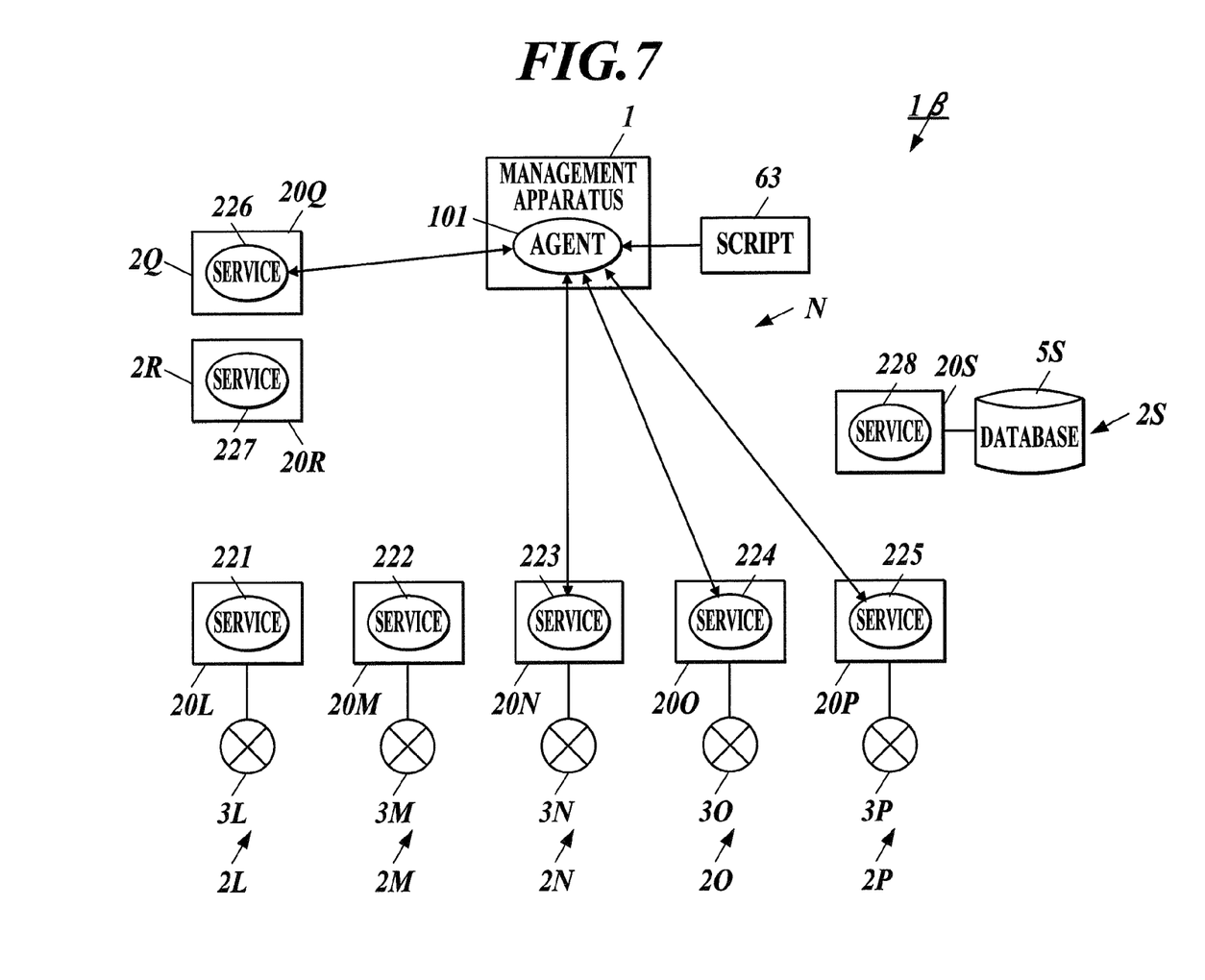
FIG. 7 is a diagram showing the configuration of the management system 1β in the case of performing a weather forecast for the coming week.

The concrete examples of the embodiment described above will be described with reference to FIGS. 6 and 7. FIG. 6 shows the configuration of a management system 1β in the case of performing the short-period road freezing prediction of the present example. FIG. 7 shows the configuration of the management system 1β in the case of performing a weather forecast for the coming week.

The management system 1β has the similar system configurations in both of the cases of the FIGS. 6 and 7, but the cases have the scripts different from each other, the cases use the services different from each other and are used for the purposes different from each other.

The management system 1β is configured to include the management apparatus 1, field equipment 2L-2P, arithmetic equipment 2Q and 2R, and database equipment 2S, and the management apparatus 1 and each of the equipment 2L-2S are connected with each other through the communication network N.

The field equipment 2L includes a control apparatus 20L and a sensor 3L, and the control apparatus 20L has a service 221. The field equipment 2M includes a control apparatus 20M and a sensor 3M, and the control apparatus 20M has a service 222. The field equipment 2N includes a control apparatus 20N and a sensor 3N, and the control apparatus 20N has a service 223. The field equipment 2O includes a control apparatus 20O and a sensor 3O, and the control apparatus 20O has a service 224. The field equipment 2P includes a control apparatus 20P and a sensor 3P, and the control apparatus 20P has a service 225.

The sensors 3L-3P are weather sensors (sensing a temperature, humidity, a wind direction, an air volume, the amount of precipitation, and the like), and it is supposed that the sensors 3L-3P are put over wide areas. The services 221-225 reply to the agent 101 with the measured values of the sensors 3L-3P, respectively.

The arithmetic equipment 2Q includes a control apparatus 20Q, and the control apparatus 20Q has a service 226. The service 226 has the function of operating the information of a weather forecast for the coming week to input values to reply. The arithmetic equipment 2R includes a control apparatus 20R, and the control apparatus 20R has a service 227. The service 227 operates short-period road freezing information to the input values to reply.

The arithmetic equipment 2S includes a control apparatus 20S and a database 5S, and the control apparatus 20S has a service 228. The database 5K stores past history information pertaining to weather.

In the management system 1β of FIG. 6, the agent 101 requests and obtains the measured values of the sensors 3L and 3O from the services 221 and 224 based on each instruction of a script 62, and requests and obtains the past history information of the database 5S from the service 228. The agent 101 then inputs these measured values and past history information to the service 227 to obtain the short-period road freezing information as an operation result.

In the management system 1β of FIG. 7, the agent 101 requests and obtains the measured values of the sensors 3N, 3O, and 3P from the services 223, 224, and 225, respectively, based on each instruction of a script 63. The agent 101 then inputs these measured values to the service 226 to obtain the information of a weather forecast for the coming week as an operation result.

A weather forecast needs to change an algorithm for forecasts and predictions, both having various objects, by using the information of several sensors. The kind, the place, and the like of necessary sensors, and further the processing algorithm are changed according to the objects. According to the present example, however, changes the script under the same architecture (system structure), and thereby the present examples can easily construct the pieces of processing of different kinds.

Incidentally, the descriptions pertaining to the embodiment and the examples, both described above, are only examples of the management system according to the present invention, and the present invention is not limited to the embodiment and the examples.

In addition, the detailed configurations and the detailed operations of the management systems $1\alpha$ and $1\beta$ in the embodiment and the examples, both described above, can be also suitably changed without departing from the scope of the present invention.

The entire disclosure of Japanese Patent Application No. 2006-168898 filed on Jun. 19, 2006, including description, claims, drawings and summary are incorporated herein by reference in its entirety.

What is claimed is:

1. A management system, comprising:
a management apparatus including a first control unit functioning as an agent; and
at least one piece of field equipment connected to the management apparatus with communication connection, the field equipment including a field equipment main body and a second control unit functioning as a first service associated with the field equipment main body,
wherein the first service provides at least one of inputting and obtaining information to the corresponding field equipment main body, and
the agent performs at least one of the inputting and the obtaining of the information to the field equipment main body through the corresponding first service based on a script describing access destinations and access contents in order,
wherein the system includes multiple field units of different communications formats, and the script format is common to all of the multiple field units.

2. The management system according to claim 1, further comprising at least one piece of arithmetic equipment connected to the management apparatus with the communication connection, the arithmetic equipment including a third control unit functioning as a second service,
wherein the second service performs a predetermined operation to an input value and provides an operation result of the operation, and
the agent inputs the input value pertaining to the information of the field equipment to the corresponding second service and obtains the operation result, based on the script describing the access to the second service.

3. The management system according to claim 2, further comprising at least one piece of database equipment connected to the management apparatus with the communication connection, the database equipment including a database and a fourth control unit functioning as a third service associated with the database,
wherein the third service provides at least one of reading, storing, and operating data to the corresponding database, and
the agent performs at least one of the reading, the storing, and the operating of the data to the database, the data pertaining to the information of the field equipment, through the corresponding third service based on the script describing the access to the third service.

4. The management system according to claim 1, further comprising at least one piece of database equipment connected to the management apparatus with the communication connection, the database equipment including a database and a fourth control unit functioning as a third service associated with the database,
wherein the third service provides at least one of reading, storing, and operating data to the corresponding database, and
the agent performs at least one of the reading, the storing, and the operating of the data to the database, the data pertaining to the information of the field equipment, through the corresponding third service based on the script describing the access to the third service.

5. The system of claim 1 wherein at least one piece of field equipment includes an actuator, said actuator receiving data from and sending data to the agent via the first service.

6. The system of claim 1, wherein the script is sent out to the at least one field unit and said script designates destination, and for that destination designates a command, and for that command designates one or more arguments.

7. The system of claim 6, wherein the script includes multiple arguments.

8. The system of claim 6, wherein the agent directly communicates with the first service via the script.

9. The system of claim 8, wherein the agent communicates with different field units communicating using different network communications using said script.

10. The system of claim 1, wherein said field equipment main body includes a measurement sensor to provide a signal of a measurement of a local area of the field equipment, said signal being transmitted via the first service to the agent.

11. A management system, comprising:
a management apparatus including a first control unit functioning as an agent;
at least one piece of field equipment; and
a control apparatus connected to the management apparatus with communication connection, the control apparatus including a second control unit functioning as a first service associated with the field equipment,
wherein the first service provides at least one of inputting and obtaining information to the corresponding field equipment, and
the agent performs at least one of the inputting and the obtainment of the information to the field equipment through the corresponding first service based on a script describing access destinations and access contents in order,
wherein the system includes multiple field units of different communications formats, and the script format is common to all of the multiple field units.

12. The management system according to claim 11, further comprising at least one piece of arithmetic equipment connected to the management apparatus with the communication connection, the arithmetic equipment including a third control unit functioning as a second service,
wherein the second service performs a predetermined operation to an input value and provides an operation result of the operation, and
the agent inputs the input value pertaining to the information of the field equipment to the corresponding second service and obtains the operation result, based on the script describing the access to the second service.

13. The management system according to claim 12, further comprising at least one piece of database equipment connected to the management apparatus with the communication connection, the database equipment including a database and a fourth control unit functioning as a third service associated with the database,
  wherein the third service provides at least one of reading, storing, and operating data to the corresponding database, and
  the agent performs at least one of the reading, the storing, and the operating of the data to the database, the data pertaining to the information of the field equipment, through the corresponding third service based on the script describing the access to the third service.

14. The management system according to claim 11, further comprising at least one piece of database equipment connected to the management apparatus with the communication connection, the database equipment including a database and a fourth control unit functioning as a third service associated with the database,
  wherein the third service provides at least one of reading, storing, and operating data to the corresponding database, and
  the agent performs at least one of the reading, the storing, and the operating of the data to the database, the data pertaining to the information of the field equipment, through the corresponding third service based on the script describing the access to the third service.

15. The system of claim 11, wherein said field equipment main body includes a measurement sensor to provide a signal of a measurement of a local area of the field equipment, said signal being transmitted via the first service to the agent.

* * * * *